United States Patent [19]

Ono

[11] Patent Number: 4,682,737
[45] Date of Patent: Jul. 28, 1987

[54] METHOD AND APPARATUS FOR PREVENTING CLOGGING OF POWDERY GRANULES IN LIGHT POWDERY GRANULE TREATING SYSTEM

[75] Inventor: Kyushichi Ono, Higashine, Japan

[73] Assignee: Asahi Breweries Ltd., Tokyo, Japan

[21] Appl. No.: 798,140

[22] Filed: Nov. 15, 1985

Related U.S. Application Data

[62] Division of Ser. No. 666,523, Oct. 30, 1984, abandoned.

[30] Foreign Application Priority Data

Jul. 30, 1984 [JP] Japan ................... 59-157644

[51] Int. Cl.[4] ........................................... B02C 25/00
[52] U.S. Cl. ....................................... 241/34; 99/276;
116/229; 241/101.3; 366/142
[58] Field of Search .............. 241/101.2, 101.3, 101.4,
241/34, 30; 366/142, 150; 116/229; 426/481;
99/276, 277, 278

[56] References Cited

U.S. PATENT DOCUMENTS

| 226,171 | 4/1880 | Hastings | 116/229 X |
|---|---|---|---|
| 1,892,839 | 1/1933 | Howard | 366/142 X |
| 2,352,312 | 6/1944 | Donaldson | 241/34 X |
| 2,851,553 | 9/1958 | Grostick | 241/34 X |
| 3,248,061 | 4/1966 | Franz | 241/34 X |
| 3,468,488 | 9/1969 | Karrer et al. | 241/34 |
| 3,995,819 | 12/1976 | Kunogi et al. | 241/101.4 |
| 4,053,653 | 10/1977 | Miyata et al. | 426/481 |
| 4,082,228 | 4/1978 | Paterson et al. | 241/34 |
| 4,227,818 | 10/1980 | Gacki et al. | 366/142 |
| 4,442,980 | 4/1984 | Oetiker et al. | 241/34 |
| 4,483,367 | 11/1984 | Ross, Jr. et al. | 116/229 X |
| 4,605,172 | 8/1986 | Ahlert . | |

FOREIGN PATENT DOCUMENTS

| 1198177 | 8/1965 | Fed. Rep. of Germany | 241/34 |
|---|---|---|---|
| 131604 | of 1960 | U.S.S.R. | 241/34 |
| 862984 | 9/1981 | U.S.S.R. | 241/34 |

Primary Examiner—Howard N. Goldberg
Assistant Examiner—Joseph M. Gorski
Attorney, Agent, or Firm—Flynn, Thiel, Boutell & Tanis

[57] ABSTRACT

In a light powder granule treating system, a light powdery granule supplying member is connected to a light powdery granule treating member through a supply conduit, and a sensing member is arranged for detecting the light powdery granules being so stagnant within the conduit as to form a massive flow of a thickness which exceeds a predetermined value. When the sensing member detects the stagnant light powdery granules, it generates a detection signal which in turn stops the light powdery granule supplying member from operating.

1 Claim, 8 Drawing Figures

METHOD AND APPARATUS FOR PREVENTING CLOGGING OF POWDERY GRANULES IN LIGHT POWDERY GRANULE TREATING SYSTEM

This application is a division of U.S. Ser. No. 666,523, filed Oct. 30, 1984, now abandoned.

FIELD OF THE INVENTION

This invention generally relates to a light powdery granule treating system and more particularly to method and apparatus for preventing clogging of light powdery granules in a system where light powdery granules are subjected to necessary treatments while being moved through closed paths under the application of wind power.

BACKGROUND OF THE INVENTION

This invention is applicable to various types of light powdery granule treating systems and especially, efficiently applicable to, for example, a system of the type for condensing lupulins of hop. Therefore, the present invention will be described hereinafter in conjunction with such a type of treating system.

This type of treating system and method have already been disclosed in U.S. Pat. Nos. 4,051,771 and 4,053,653. The known system is partially modified and illustrated in FIG. 1.

To describe the system briefly, a supply conduit 1 comprises a magnetic separator having a hopper and magnets mounted on the outer surface of the hopper. Lupulins supplied to this supply conduit are fed to a conveying pipe 51 via a treating means 2 comprising a screw feeder and conveyed by wind power through the pipe 51 to a storage tank 3. Part of the conveying air reaching an air pipe 52 via an upper portion of the storage tank 3 is drawn by an air blower 16 into a cooler 15 and cooled thereat. Eventually, the cooled air circulates to the conveying pipe 51. Eventually, the cooled air circulates to the conveying pipe 51. Consequently, the hops are normally cooled to $-5°$ C. or less and water contained therein is frozen. The remainder of the conveying air discharged from the upper portion of the storage tank 3 is sucked by a suction pump 18 so as to be drawn into an air cooler 17 within which it is cooled, and eventually circulates to the storage tank 3. A stirring blade 25 is disposed at the bottom of the storage tank 3 which is connected with a supply means 26 comprising a screw feeder, so that the hops cooled to about $-20°$ C. by the cooling wind are stirred by the blade 25 and conveyed by the supply means 26 so as to be fed via a supply conduit 27 to a treating means 4 comprising a crusher.

The hops crushed at the treating means 4 are conveyed through a conveying pipe 53 under the application of wind power to a first cyclone 12 where the conveying air and the hops are separated from each other. The air is fed to a first bag filter 14 via an air pipe 54 and drawn into an air cooler 19 by the actio of a first turbofan 20. Part of the air circulates to the conveying pipe 53 via an air pipe 55. Meanwhile, the separated hops are conveyed, through a supply conduit 22 with an air locker 13, to a treating means 5 comprising a shaking sieve.

The treating means 5 has a sieve which consists of several stages of different meshes, so that minus sieve or undersize granules are fed to a receiver 7, plus sieve or oversize granules are fed to a crusher 28 via a supply conduit 23, and air containing the remaining powdery granules is fed via an air pipe 56 to a second bag filter 29. Eventually, the air removed of the powdery granules is drawn up by the action of a second turbofan 21 toward the atmosphere and the granules precipitate so as to be discharged to the outside.

The oversize granules are crushed by the crusher 28 in the same manner as by the treating means 4, and resulting granules are fed via a conveying pipe 57 to a second cyclone 30 where air is separated from the granules or hops. The air is discharged to the air pipe 54 via an air pipe 58, and the hops are conveyed, through a supply conduit 32 with an air locker 31, to a rotary sieve 6. Minus sieve granules are discharged to a receiver 33, and plus sieve granules, put together, are discharged to an outlet pipe 34 with an air locker 8. The plus sieve granules are crushed by air supplied from an air blower 9, fed to a storage tank 10 for waste, and exhausted therefrom through a screw conveyor 35 to a waste packer 11.

In the above system, a crusher 38 is disposed, though not disclosed in the aforementioned U.S. Patent, before the supply conduit 1 as shown in FIG. 2. The crusher 38 has a hammer 37 which is rotated by a motor, not shown, to crush the raw hops. The thus crushed hops are supplied to the supply conduit 1 equipped with magnets 41 through a bucket conveyor 40 driven by a motor 39.

The treating system described so far fulfils its excellent function as detailed in the aforementioned U.S. Patent but it still faces difficulties that clogging of the powdery granules occurs in the line system, particularly, in the supply conduits 1 and 27 and air cooler 17 connected to the treating means 2, 4 and 5, respectively. When a predetermined operational condition is set in respect of the raw hops used as a material to be treated, the clogging will occur if the hop change in quality, or the clogging will occur dependent on the weather condition during operation and the condition of the system even if the hops remain unchanged. The clogging thus caused leads to troubles of the system and the occurrence of the clogging must be prevented. To this end, the setting of the operational conditions must be revised frequently in consideration of the above conditional factors but adjusting operations for this purpose are difficult to achieve and time consuming, thus deteriorating efficiency and the quality of the material to be treated. In addition, once the clogging occurs, the operation of the system must be stopped and components of the system subject to the clogging must be disassembled for removal of the clogging.

Under the circumstances, the inventors of the present invention have studied measures for elimination of the above disadvantages and searched for the cause of the occurrence of the clogging to find a phenomenon to be described below with reference to FIG. 2. When the amount of hops "a" supplied to the supply conduit 1 through the bucket conveyor 40 is balanced with the amount of hops discharged to the outside through the treating means 2, the hops "a" form a thin massive flow, as indicated by solid line, which slips down within the supply conduit 1. But, as the supply amount increases to exceed the outlet amount, the hops begin to stagnate gradually within the supply conduit 1. When the stagnant hops form a thick massive flow which exceeds a thickness as indicated by chained line, clogging of the hops or powdery granules takes place. To eliminate this adverse phenomenon, it may be conceived that the supply amount is always held in excess of the outlet amount by making the treating means 2 have a treating capacity which is greater than that of the conveyor 40. This expedient is however fruitless because the treating means 2 is required to have a capacity which is greater than that normally required and which becomes therefore surplus during the normal operation. Such an inconvenience may be overcome or avoided by decreasing the supply amount in proportion to a decrease in the outlet amount.

SUMMARY OF THE INVENTION

This invention is based the considerations as described above and has for its object to provide method and apparatus for preventing clogging of light powdery granules which can efficiently prevent occurrence of the clogging to avoid possible deterioration of operation efficiency and quality as well as occurrence of troubles in the system, thereby eliminating the aforementioned disadvantages inherent to the conventional system.

According to this invention, a method directed to accomplish the above object in a light powdery granule treating system comprises causing a supply means to supply light powdery granules to a treating means through a supply conduit connected thereto, causing a sensing means disposed within the supply conduit to detect the light powdery granules being so stagnant within the supply conduit as to form a massive flow of a thickness which exceeds a predetermined value and to generate a detection signal, and stopping, in response to the generation of the detection signal, the supply means from supplying the light powdery granules to the supply conduit.

According to this invention, an apparatus directed to accomplish the above object in a light powdery granule treating system comprises a treating means for treating light powdery granules, a conduit, connected to the treating means, for supplying the light powdery granules thereto, a supply means for supplying the light powdery granules to the conduit, a sensing means, disposed within the conduit, for detecting the light powdery granules being so stagnant within the conduit as to form a massive flow of a thickness which exceeds a predetermined value and generating a detection signal, and means responsive to the detection signal to stop the supply means from operating.

Another object of this invention is to provide an apparatus for preventing clogging of light powdery granules which can accurately detect clogging of light powdery granules within the conduit in accordance with a specific gravity of the light powdery granules passing through the conduit, and stop, at a good timing, the supply of the light powdery granules to the conduit after the occurrence of the clogging, thereby preventing premature stoppage of the supply responsible for deterioration of operation efficiency, excessively retarded stoppage of the supply responsible for surplus operation for removal of the clogged light powdery granules before restarting of the treating operation, and unwanted expenditure of cost of the surplus operation.

This object can be attained by an apparatus for prevention of the clogging according to an embodiment of this invention comprising, as the sensing means, a limit switch body, a sensing lever connected to the body, and hollow ball connected, as necessary, to the tip of the sensing lever, the required actuatable force for the sensing lever being in proportion to a specific gravity of the light powdery granules being detected so as to be larger for light powdery granules of a large specific gravity than for light powdery granules of a small specific gravity.

DETAILED DESCRIPTION OF PREFERRED EMBODIMENTS OF THE INVENTION

Figure 1:
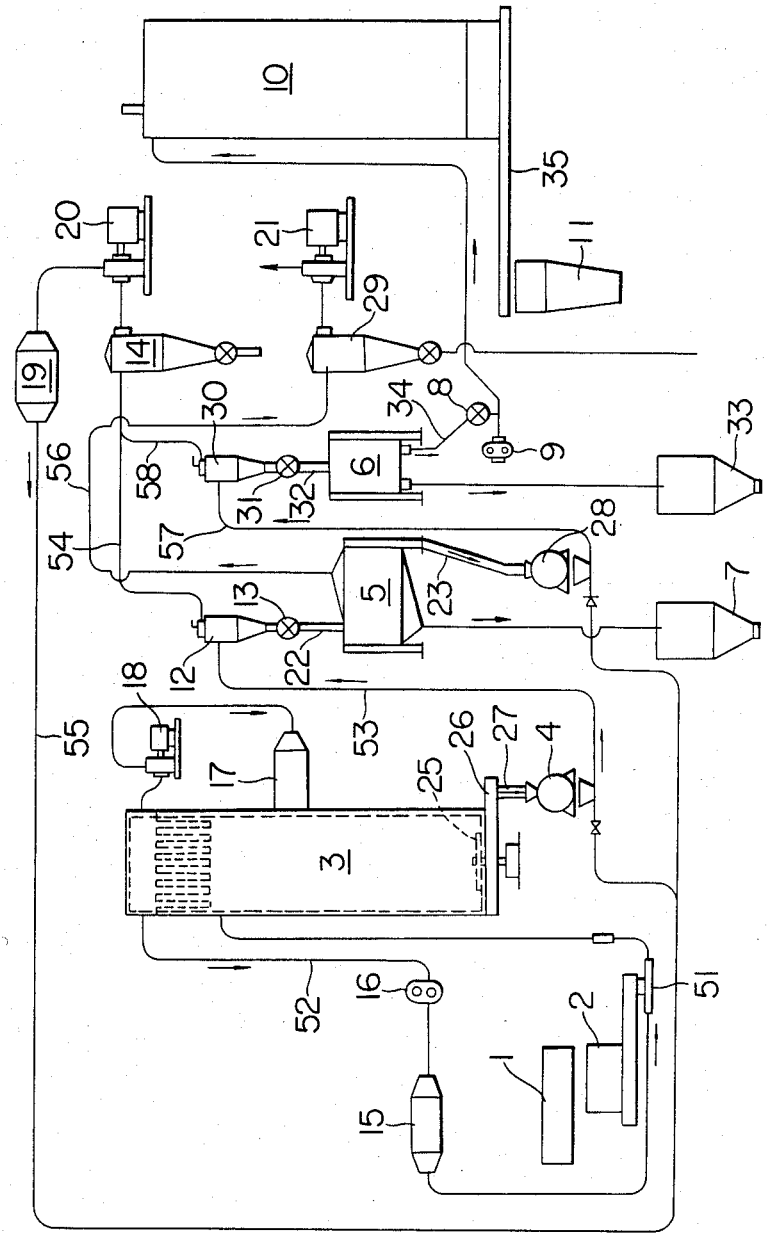
FIG. 1 is a schematic diagrammatic representation showing the layout of a typical example of a prior art light powdery granule treating system.
Figure 2:
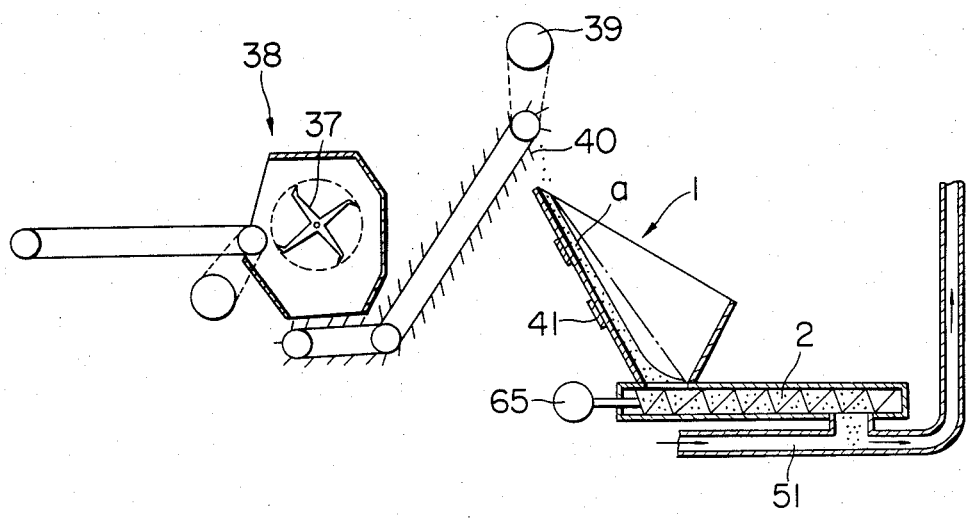
FIG. 2 is an enlarged longitudinal sectional view showing a part of the FIG. 1 system.
Figure 3:
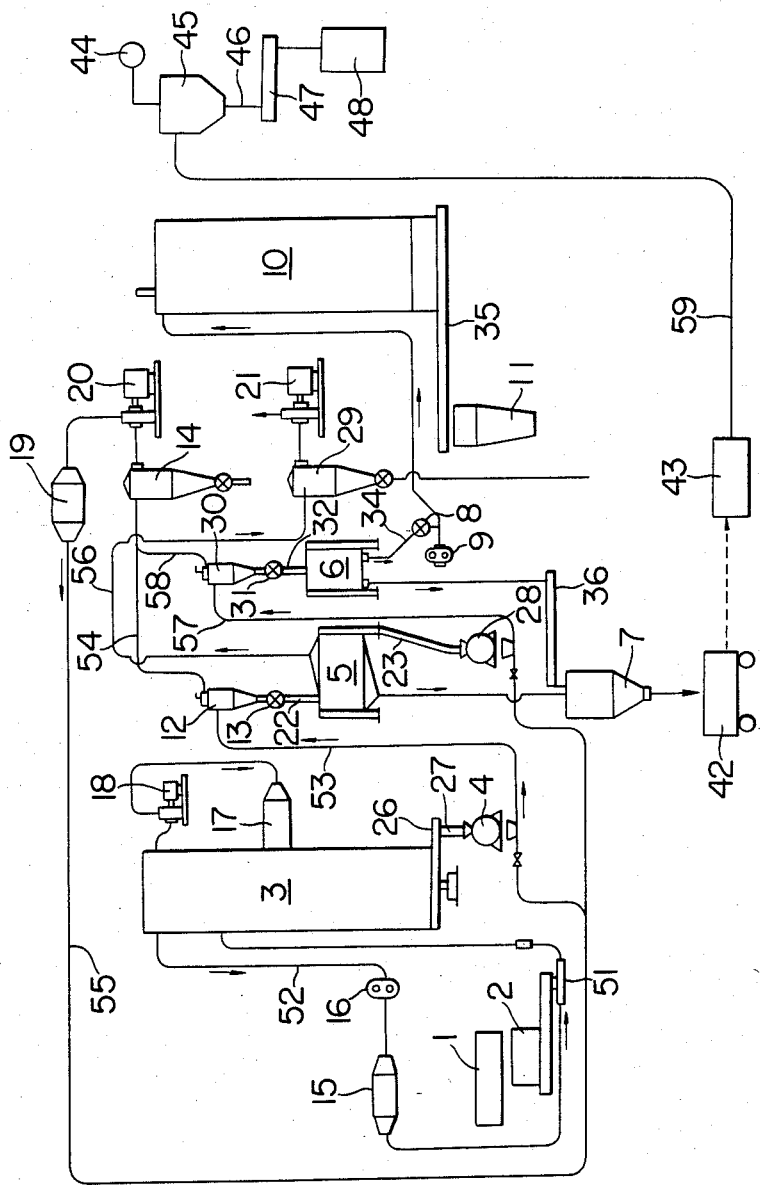
FIG. 3 is a schematic diagrammatic representation showing the layout of a light powdery granule treating system incorporating apparatus for prevention of clogging according to this invention.

The overall layout of a light powdery granule treating system to which the present invention is applicable is illustrated in FIG. 3 in which component elements corresponding to those of FIG. 1 are designated by identical reference numerals. Thus, like parts will not described to avoid prolixity of explanation, with the following description mainly directed to the remaining parts.

In the preferred embodiment described herein, the second receiver 33 of the prior art system is replaced by a screw conveyor 36 connected to the receiver 7.

Hops are conveyed by a mixing car 42 from the receiver 7 to a storage tank 43, from which the hops are conveyed through a conveying pipe 59, under the application of suction force by a vacuum pump 44, to a vacuum mucker 45. The hops are then fed, via a supply conduit 46, from the mucker 45 to a treating means 47 comprising a screw feeder through which the hops are eventually fed to a pelletizer 48.

Figure 4:
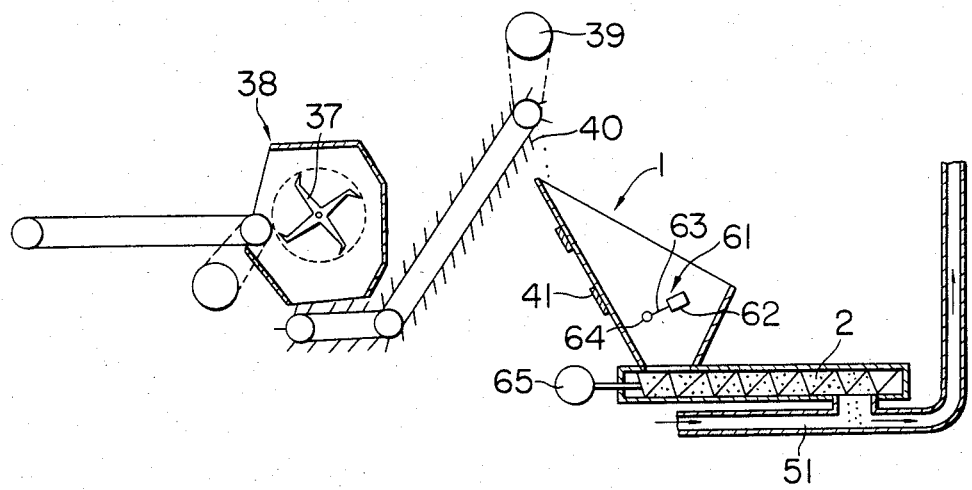
FIG. 4 is a front view, longitudinally sectioned, of an apparatus for prevention of clogging according to an embodiment of this invention arranged in the treating system shown in FIG. 3.

FIG. 4 shows an apparatus for preventing clogging of hops or light powdery granules according to an embodiment of the present invention. Specifically, there is provided a sensing means 61 arranged within the supply conduit 1 having the magnets 41 mounted on its outer surface. The sensing means 61 comprises a limit switch body 62, a sensing lever 63 connected to the body 62, and a hollow ball 64 connected to the tip of the sensing lever 63. In experiments, a sensing means was used having a length between the body 62 and the ball 64 measuring about 170 mm, a diameter of the ball 64 measuring about 38 mm, a maximum actuatable angle of 30°, and a required actuatable force of about 30 gr-cm. The actuation of the sensing means is non-directional, and the treating means 2 is driven by a motor 65.

Figure 5:
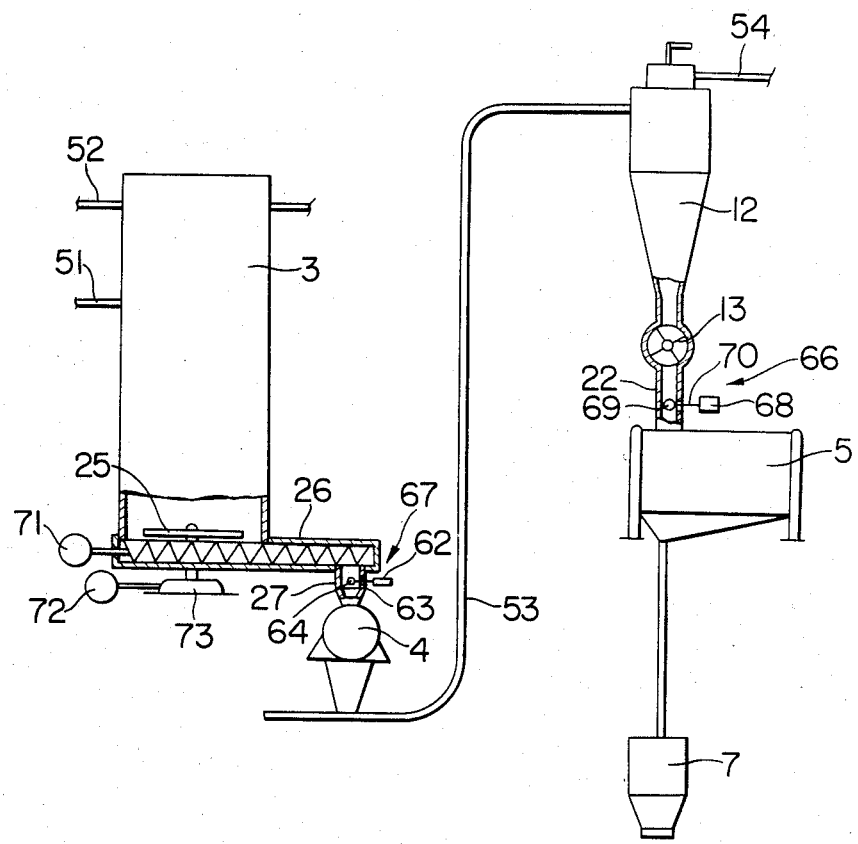
FIG. 5 is a fragmentary front view, longitudinally sectioned, of apparatus for prevention of clogging according to two different embodiments of this invention arranged in the treating system shown in FIG. 3.

FIG. 5 shows clogging prevention apparatus according to two different embodiments of the present invention in which sensing means 66 and 67 are arranged within the supply conduits 22 and 27, respectively. As the sensing means 67, the same sensing means as means 61 is used. The sensing means 66, like the means 61, comprises a limit switch body 68, a sensing lever 70, and a hollow ball 69 connected to the tip of the lever 70. A sensing means 66 was used in experiments, having a length between the body 68 and the ball 69 measuring about 45 mm, a diameter of the ball 69 measuring about 15 mm, a maximum actuatable angle of 25°, and a required actuatable force of about 5 gr-cm. The supply means is driven by a motor 71, and a stirring device 73 for the stirring blade 25 is driven by a motor 72.

Figure 6:
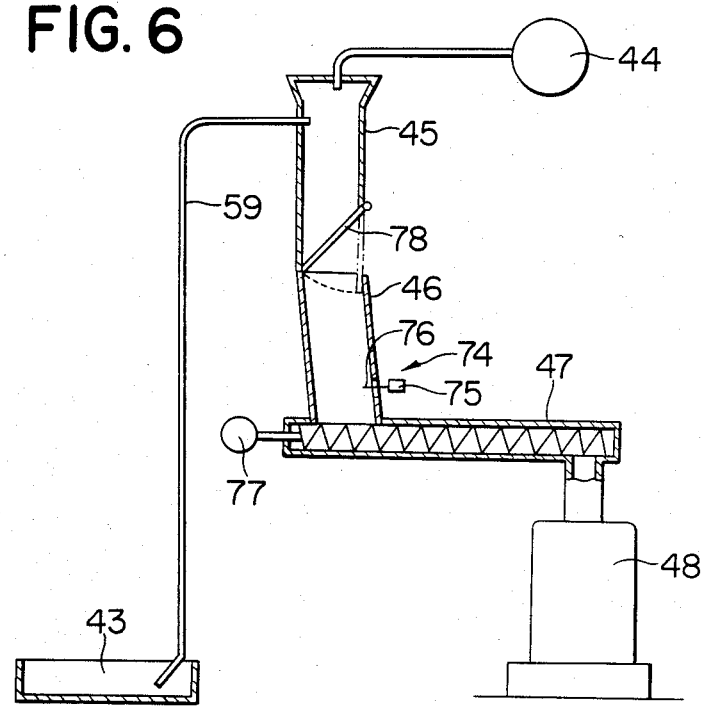
FIG. 6 is a fragmentary front view, longitudinally sectioned, of an apparatus for prevention of clogging according to still another embodiment of this invention arranged in the FIG. 3 treating system.

FIG. 6 illustrates a clogging prevention apparatus according to still another embodiment in which a sensing means 74 is arranged within the supply conduit 46 through which hops are supplied from the vacuum mucker 45 to the treating means 47. A sensing means 74 used in experiments had a sensing lever 76 connected to a limit switch body 75 and constituted by a coil spring having a diameter of about 7 mm and a length of about 100 mm, and a required actuatable force of about 60 gr-cm, and its actuation was non-directional. The treating means 47 is driven by a motor 77, and the vacuum mucker 45 is opened or closed by a damper 78.

The operation of the apparatus according to each of the previous embodiments will now be described.

Figure 7A:
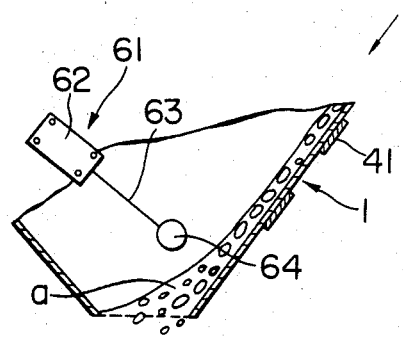
FIG. 7A is a fragmentary sectional view showing the status of the FIG. 4 embodiment during normal operation.

Referring to FIGS. 4 and 7A, when hops "a" dropping from the bucket conveyor 40 into the supply conduit 1 normally flow downwards as shown in FIG. 7A, the ball 64 of the sensing means 61 is spaced apart from a massive flow of the hops and the sensing lever 63 or the limit switch body 62 is not actuated. Under this condition, magnetic materials such as steel pieces contained in the hop a are attracted and removed by the magnets 41.

Figure 7B:
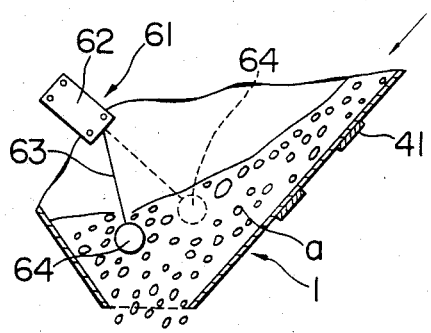
FIG. 7B is a similar view showing the status of the FIG. 4 embodiment during occurrence of the clogging.

As the hops "a" begin to stagnate and a massive flow of the hops becomes thick as shown in FIG. 7B, the ball 64 becomes buried in the massive flow as shown at chained line in FIG. 7B and is gradually deflected downwards by a pressure of the flow until a position indicated by solid line at which the sensing means 61 is turned off. With the sensing means 61 turned off, the motor for the crusher 38 and the motor 39 for the conveyor 40 are stopped. As the formation of the thick massive flow of hops proceeds, clogging of the hops takes place and removal of the magnetic materials becomes impossible.

Meanwhile, the treating means 2 continues to operate and the thickness of the massive flow of hops "a" within the supply conduit 1 is gradually reduced. When the thickness decreases below a predetermined value, the ball 64 is unloaded and the sensing lever 63 recovers its initial position to turn on the sensing means 61. As a result, the crusher 38 and the conveyor 40 restart to operate, and the hops "a" recover the normal flow, permitting again the removal of the magnetic materials.

Referring now to FIG. 5, when the supply conduit 22 or 27 is clogged with hops so that the sensing means 66 or 67 becomes buried in the hops and turned off for the same reason set out previously, the motors 71 and 72 are stopped to stop the stirring device 73 and supply means 26. However, the treating means 4 and 5 continues to operate and hence the conveyance of the light powdery granules treated at the treating means 4 continues through the conveying pipe 53. Consequently, the amount of the light powdery granules being stagnant within the supply conduits 22 and 27 is gradually decreased to unload the sensing means 66 and 67. These sensing means 66 and 67 are then turned on to restart the operation of the stirring device 73 and the supply means 26, and the hops recover the normal flow. Being different from turning-on of the sensing means 61, turning-on of the sensing means 66 and 67 does not lead to immediate restarting of the operation of the motor 71 and 72. Specifically a timer is so connected in the motor drive circuit that the motors 71 and 72 are restarted to operate about 20 to 30 seconds after the turning-on of the sensing means 66 and 67. This retardation is effective to smooth the flowage of the hops within the supply conduit 27, treating means 4, conveying pipe 53, air locker 13 and supply conduit 22. Especially, since clogging in this section of the system has an extremely adverse effect on the system, there are provided an alarm lamp and an alarm buzzer which are turned on when the sensing means 66 and 67 are turned on and in addition, a counter for recording the number of cloggings is arranged in the control circuit. The required actuatable force for the sensing means 66 in this line section of the system is made small as described previously. This is because the hops flowing through this line section have a small specific gravity and therefore the sensing means 66 is required to be actuated by a small load corresponding to the small specific gravity. If a sensing means requiring a large actuatable force is otherwise employed in this section, because of low sensitivity of this sensing means to the loading, a phenomenon of over-clogging which is difficult to eliminate will take place.

Referring now to FIG. 6, when the supply conduit 46 is clogged with hops and the sensing means 74 is turned on, the vacuum pump 44 is stopped. The treating means 47, on the other hand, continues to operate and the interior of the supply conduit 46 is gradually emptied with the sensing means 74 eventually turned on and the vacuum pump 44 restarted to operate. The actuatable force required for the sensing means in this line section of the system is the maximum as described previously. This is because the granular size of the hops passing through the supply conduit 46 is minimized and the hops are so highly condensed that a sensing means 74 otherwise having a small actuatable force will be operated by a premature clogging of the hops. The sensing means 74 of the maximum actuatable force is valid for avoiding such an inconvenience.

As has been described, according to the present invention, the sensing means is disposed in the supply conduit connecting the supply means for the light powdery granules and the treating means, and the light powdery granules being stagnant within the supply conduit to form a massive flow of a thickness which exceeds a predetermined value is detected by the sensing means to generate a detection signal which in turn stops the supply means from operating. Consequently, clogging of the light powdery granules within the supply conduit can be prevented, followed by the prevention of deterioration of operation efficiency and quality as well as the prevention of occurrence of troubles in the system due to the clogging.

It should be appreciated that the sensing means is not limited to the construction as exemplified in the foregoing embodiments having the hollow ball connected to a portion of the sensing lever or the coil spring without the ball but may be modified to various configurations and structures.

Further, a sensing means may also be arranged in the supply conduit 23 connected to the crusher 28. In this case, the sensing means 51 may be employed.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An apparatus for treating hops, which comprises:
a first crusher for crushing hops, and a first motor for driving said crusher; a bucket conveyor connected to said first crusher for conveying crushed hops therefrom, and a second motor for driving said bucket conveyor; a hopper for receiving crushed hops from said bucket conveyor, said hopper having a discharge opening at its lower end and a sloping wall extending upwardly from said discharge opening, said sloping wall being adapted to support a layer of crushed hops that moves therealong toward said discharge opening; a first limit switch associated with said hopper for controlling operation of said first and second motors, a first sensing lever connected to said first limit switch to actuate said first limit switch, a hollow ball connected to said first sensing lever, said ball being disposed close to said sloping wall for sensing the thickness of the layer of crushed hops thereon and causing said first sensing lever to actuate said first limit switch to turn off said first and second motors when the layer exceeds a predetermined thickness; a first screw feeder having an inlet connected to said discharge opening of said hopper for receiving crushed hops from said discharge opening, said first screw feeder having an outlet for discharging crushed hops therefrom; a first pneumatic conveyor connected to said outlet of said first screw feeder for conveying crushed hops from said first screw feeder and cooling said crushed hops; a storage tank and means connecting said storage tank to said first pneumatic conveyor so that said storage tank receives the crushed hops from said first pneumatic conveyor, said storage tank having an outlet at its lower end; a stirring device in said storage tank close to the outlet thereof, and a third motor for driving said stirring device; a second screw feeder having an inlet connected to the outlet of said storage tank for receiving crushed hops therefrom, said second screw feeder having an outlet for discharging the crushed hops, and a fourth motor for driving said second screw feeder; a first conduit extending downwardly from the outlet of said second screw feeder; a second limit switch associated with said first conduit for controlling operation of said third and fourth motors, a second sensing lever extending into said first conduit and connected to said second limit switch to actuate said second limit switch, a hollow ball connected to said second sensing lever and disposed inside said first conduit, so that when said first conduit becomes clogged with crushed hops, said second limit switch is actuated to turn off said third and fourth motors; a second crusher having an inlet and means connecting said inlet of said second crusher to said first conduit so that said inlet of said second crusher receives crushed hops from said first conduit, said second brusher being adapted for further crushing the hops; a second pneumatic conveyor connected to said second crusher for conveying crushed hops from said second crusher and cooling said crushed hops; a cyclone and means connecting said cyclone to said second pneumatic conveyor so that said cyclone receives the crushed hops from said second pneumatic conveyor and separates air therefrom, said cyclone having an outlet at its lower end; a second conduit connected to and extending downwardly from the outlet of said cyclone; a third limit switch associated with said second conduit for controlling operation of said third and fourth motors, a third sensing lever extending into said second conduit and connected to said third limit switch to actuate said third limit switch, a hollow ball connected to said third sensing lever and disposed inside said second conduit, so that when said second conduit becomes clogged with crushed hops, said third limit switch is actuated to turn off said third and fourth motors; a shaking sieve having an inlet and means connecting said inlet of said shaking sieve to said second conduit so that said shaking sieve receives crushed hops from said second conduit, said shaking sieve comprising means for separating the crushed hops into first undersize and first oversize fractions; a third crusher for crushing the first oversize fraction; a third pneumatic conveyor connected to said third crusher for conveying hops from said third crusher; a rotary sieve connected to said third pneumatic conveyor for receiving hops from said third pneumatic conveyor, said rotary sieve comprising means for separating said hops into second undersize and second oversize fractions; means for combining said first and second undersize fractions; a second storage tank for receiving the combined undersize fractions of the hops; a vacuum mucker and a vacuum pump therefor for drawing the combined undersize fractions from said second storage tank, a fifth motor for driving said vacuum pump, said vacuum mucker having an openable damper, said vacuum mucker having an outlet at its lower end; a third screw feeder having an inlet connected to the outlet of said vacuum mucker for receiving hops therefrom and having an outlet for discharging the hops; a third conduit connected to and extending downwardly from the outlet of said vacuum mucker; a fourth limit switch associated with said third conduit for controlling operation of said fifth motor, a fourth sensing lever extending into said third conduit and connected to said fourth limit switch to actuate said fourth limit switch, so that when said third conduit becomes clogged with crushed hops, said fourth limit switch is actuated to turn off said fifth motor; and a pelletizer for receiving the hops from said third screw feeder, and comprising means for pelletizing the hops.

* * * * *